US010127590B2

(12) United States Patent
Bawge et al.

(10) Patent No.: US 10,127,590 B2
(45) Date of Patent: Nov. 13, 2018

(54) METHODS AND SYSTEMS SUPPORTING ONLINE SHOPPING AS A SHARED AND SOCIAL ACTIVITY

(71) Applicant: Sears Brands, L.L.C., Hoffman Estates, IL (US)

(72) Inventors: Vivek Bawge, Magarpatta (IN); Partha Ghosh, Pune (IN)

(73) Assignee: Sears Brands, L.L.C., Hoffman Estates, IL (US)

(*) Notice: Subject to any disclaimer, the term of this patent is extended or adjusted under 35 U.S.C. 154(b) by 378 days.

(21) Appl. No.: 14/966,701

(22) Filed: Dec. 11, 2015

(65) Prior Publication Data

US 2016/0171578 A1    Jun. 16, 2016

(30) Foreign Application Priority Data

Dec. 15, 2014  (IN) .......................... 6312/CHE/2014

(51) Int. Cl.
*G06Q 30/00* (2012.01)
*G06Q 30/06* (2012.01)
*G06Q 50/00* (2012.01)
*H04L 12/58* (2006.01)

(52) U.S. Cl.
CPC ..... *G06Q 30/0613* (2013.01); *G06Q 30/0623* (2013.01); *G06Q 50/01* (2013.01); *H04L 51/32* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | |
|---|---|---|---|
| 6,850,917 | B1 | 2/2005 | Hom et al. |
| 6,876,977 | B1 | 4/2005 | Marks |
| 7,647,247 | B2 | 1/2010 | Abraham et al. |
| 7,720,722 | B2 | 5/2010 | Ho et al. |
| 2007/0239552 | A1 | 10/2007 | Sundaresan |
| 2008/0154632 | A1 | 6/2008 | Jacobi et al. |
| 2008/0189189 | A1 | 8/2008 | Morgenstern |
| 2009/0055285 | A1 | 2/2009 | Law et al. |
| 2009/0265253 | A1 | 10/2009 | Gabriel et al. |
| 2012/0185355 | A1* | 7/2012 | Kilroy ................ G06Q 30/0633 705/26.8 |
| 2013/0211953 | A1 | 8/2013 | Abraham et al. |
| 2014/0025601 | A1* | 1/2014 | Wouhaybi .......... G06Q 30/0201 705/347 |
| 2014/0172630 | A1 | 6/2014 | Dogin et al. |

FOREIGN PATENT DOCUMENTS

EP         1170690 A1     1/2002

* cited by examiner

*Primary Examiner* — Ethan D Civan
(74) *Attorney, Agent, or Firm* — McAndrews, Held & Malloy, Ltd.

(57) ABSTRACT

Certain embodiments of the disclosure relate to methods and systems that enable a consumer to electronically shop for products using a conventional electronic shopping cart such as are typically provided by online merchants, and to also create and manage one or more additional "shared" electronic shopping carts through which the end-user may automatically share details of such shopping activities with others using electronic means such as online social networks, short message services, and email, thereby enabling others to participate and assist in various shopping activities.

21 Claims, 12 Drawing Sheets

US 10,127,590 B2

METHODS AND SYSTEMS SUPPORTING ONLINE SHOPPING AS A SHARED AND SOCIAL ACTIVITY

CROSS-REFERENCE TO RELATED APPLICATIONS/INCORPORATION BY REFERENCE

The present application makes reference to, claims priority to, and claims the benefit of Indian Patent Application No. 6312/CHE/2014, filed on Dec. 15, 2014, the contents of which is hereby incorporated herein by reference in its entirety.

FIELD

Certain embodiments of the disclosure relate to on-line shopping via electronic commerce (e-commerce) platforms. More specifically, certain embodiments of the disclosure relate to methods and systems that enable a consumer to electronically shop for products using a conventional electronic shopping cart such as are typically provided by online merchants, and to also create and manage one or more additional "shared" electronic shopping carts through which the end-user may automatically share details of such shopping activities with others using electronic means such as online social networks, short message services, and email, thereby enabling others to participate and assist in various shopping activities.

BACKGROUND

Shopping for products and services is very often a solitary activity, with little or no real-time interaction with other individuals with whom one has a personal relationship, such as friends, family, and colleagues. The popularity of traditional shopping at "brick-and-mortar" shopping malls is rapidly being replaced by other means of purchasing products and services, including the use of the Internet. Information about products and services, and personal experiences and opinions of others may be submitted to online websites, and may be reviewed by shoppers looking to make a purchase. The identity and reliability of those submitting such information are more often than not, unknown to those reading the information.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method supporting online shopping as a shared and social activity, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Figure 1:
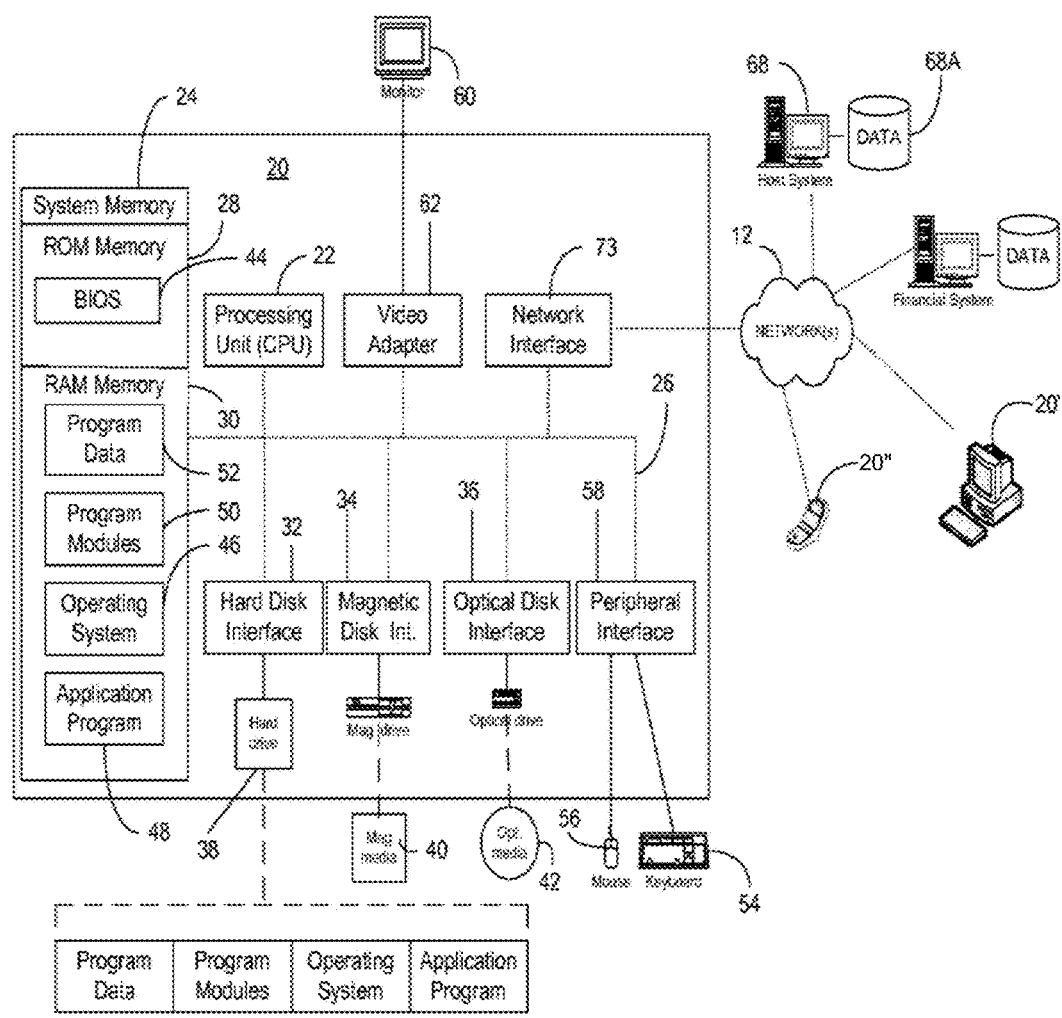
FIG. 1 is an illustration of an exemplary computer network in which a representative embodiment of the present disclosure may be practiced.

Certain embodiments of the disclosure relate to the operation of electronic commerce (e-commerce) platforms. More specifically, certain embodiments of the disclosure relate to methods and systems that enable a consumer to electronically shop for products using a conventional electronic shopping cart such as are typically provided by online merchants, and to also create and manage one or more additional "shared" or "social" electronic shopping carts through which the end-user may automatically share details of such shopping activities with others using electronic means such as online social networks, short message services, and email, thereby enabling others to participate and assist in various shopping activities. The present application is not related to conventional physical shopping carts typically used in retail stores.

The following discussion of various example embodiments of the present disclosure are not meant to be limiting in any way, unless explicitly recited in the claims, but are offered as illustrative embodiments to aid in understanding. To also aid in clarity while reviewing the preset application, the present disclosure uses a number of terms to help describe such illustrative embodiments.

The terms "user," "end-user," "customer," "consumer", and "member" may be used herein to refer to a potential or existing purchaser of products and/or services of a business or merchant.

The terms "e-commerce" and "m-commerce" may be used herein to refer to business or commerce that is transacted electronically, as over the Internet.

The terms "social e-commerce" and "social m-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The term "social network" may be used herein to refer to a network of family, friends, colleagues, and other personal contacts, or to an online community of such individuals who use a website or other technologies to communicate with each other, share information, resources, etc.

The term "social graph" may be used herein to refer to a representation of the personal relationships or connections between individuals in a population.

The term "social signal" may be used herein to refer to an expression by a user of a relationship with or feeling about a person, product, or thing. In the context of the present disclosure, the terms "social signal" and "social signal information" refer to a relationship with or feeling about a product.

The terms "like," "want," "have" or "own," and "recommend" may be used to refer to particular social signals that may be represented on a web page in association with a product, and may be selected by a consumer to represent their relationship with or feeling about the product.

The terms "merchant" and "sponsoring merchant/merchants." may be used herein to refer to the owner and/or operator of a business enterprise that either operates an e-commerce promotions platform system as described herein, or enters into an agreement with another to operate or provide services of such an e-commerce promotions platform on their behalf.

The term "loyalty program" may be used herein to refer to a structured marketing effort that rewards, and therefore encourages, loyal buying behavior that is potentially beneficial to the business or firm operating or sponsoring the loyalty program. A "member" of such a loyalty program may be a consumer that has provided personal information to an operator or sponsor of the loyalty program in order to gain access to benefits provided by the loyalty program.

The term "follow" may be used herein to refer to a user request to be kept informed about a particular person, place, or thing. The term "following" may be used herein to refer to an end-user that has requested to be kept informed about a particular person, place, or thing.

The term "share" may be used herein to refer to a user request to communicate information about what is being viewed by a user to members of the user's family, friends, or social network.

As utilized herein, the terms "exemplary" or "example" means serving as a non-limiting example, instance, or illustration. As utilized herein, the term "e.g." introduces a list of one or more non-limiting examples, instances, or illustrations.

Some representative embodiments of the present disclosure may have an integrated social media functionality that allows consumers or end-users to communicate product, service, manufacturing, sales, and other information with others, and to search for products of interest, poll friends, family, and others, recommend products and receive product recommendations, and plan for and participate in events in their lives and the lives of others.

In a present-day online shopping experience, each end-user visiting a merchant web site is typically provided with a means to hold the products that they select for purchase. Such an electronic repository for holding product items selected for purchase may be referred to as a "shopping cart." Many present-day e-commerce web sites use such a "shopping cart model," in which the consumer visiting the web site is automatically provided with a system-generated "shopping cart" in which products selected by the consumer may be "added" to the "shopping cart" for later review, removal, or purchase. At the conclusion of a shopping session during which the consumer has identified the desired items and added them to the system-provided shopping cart, the consumer may then choose to review the contents of their shopping cart, and go through a "check-out" process to purchase the selected products, including providing payment and shipment/delivery information.

In a representative embodiment according to the present disclosure, the consumer may also be provided the opportunity to create one or more "shared" or "social" shopping carts in which to place product items selected by the consumer for, among other purposes, sharing with friends, family, and others having access to the merchant web site. The terms "shared" and "social" may be used herein with respect to such shopping carts because the entity (i.e., "owner") that creates the shopping cart(s) may permit the sharing of information about the shopping cart(s), allowing others to be socially involved or aware of activity regarding the shopping cart(s) by, for example, viewing the contents of, modifying the contents of, and being kept up-to-date regarding various actions or activities that affect the shopping cart(s). To facilitate access, each shared/social shopping cart may be given an identifier or name by its owner, and end-users of the merchant web site may search for shopping carts to view using the name or identifier assigned by the owner. In a representative embodiment according to the present disclosure, shared/social shopping carts may be created and managed by end-users of the merchant web site, and by the operator of the merchant web site, for various purposes of the operator or the merchant sponsoring the web site (e.g., for advertising, contests, etc.).

An end-user of a merchant web site may request that they be permitted to "follow" a particular shared/social shopping cart owned/managed by another end-user or for the merchant. The term "follow" may be used herein with respect to a particular shared/social shopping cart to indicate that an end-user has requested to be kept informed about actions that take place with respect to that particular shared/social shopping cart. For example, in accordance with the present disclosure, a first end-user that is "following" a particular shared/social shopping cart of a second end-user may be permitted to view the contents of a shared/social shopping cart, and may be informed (i.e., sent a "notification") when, for example, certain changes occur that relate to the shared/social shopping cart that they are "following."

For example, a first end-user of a merchant social e-commerce web site according to the present disclosure may create a shared/social shopping cart named, for example, "SCart1." The first end-user may then invite one or more other end-users to "follow" the "SCart1" shared/social shopping cart. In a representative embodiment according to the present disclosure, such invitations may be delivered using any suitable messaging mechanism including, by way of example and not limitation, an email message, a message exchanged using a social e-commerce web site (e.g., the Sears ShopYourWay web site), a short text messaging (SMS) or multimedia messaging service (MMS) message, or a social networking web site (e.g., Facebook, Twitter, Pinterest, Tumblr, or the like). Any invited end-user(s) that are connected to a social e-commerce web site upon which the shared/social shopping cart of the invitation resides may receive an immediate notification on the web pages presented to them for viewing during their online activities on the web site. Those invitees that accept the invitation to follow (i.e., the "following" end-users) may then view and comment on the contents of the shared/social shopping cart "SCart1." In a representative embodiment of the present disclosure, all of those end-users that "follow" the shared/social shopping cart "SCart1" will receive notifications when certain actions occur that are related to "SCart1." Examples of such actions include, by way of illustration and not limitation, when the creator/owner adds or removes a product item to/from "SCart1;" when another end-user of the merchant web site accepts an invitation from the owner/creator of "SCart1" or anyone "following" "SCart1" to "follow" "SCart1;" and/or when the creator/owner of "SCart1" or anyone "following" "SCart1" submit a comment on "SCart1." Further examples of such actions include, by way of illustration and not limitation, when the creator/owner of "SCart1" or anyone "following" "SCart1" submits a review of a product item in "SCart1;" and when the creator/owner of "SCart1" or anyone "following" "Scart1" places a product item from "Scart1" into their system-provided shopping cart.

In a representative embodiment according to the present disclosure, an end-user of a merchant web site may also request that they be permitted to "join" a particular shared/social shopping cart. The term "join" may be used herein with respect to a particular shared/social shopping cart to indicate that, in addition to be allowed to "follow" a particular shared/social shopping cart, an end-user has requested to be permitted to perform certain actions with respect to that particular shared/social shopping cart that are normally permitted to be performed only by the creator/owner of the particular shared/social shopping cart. For example, an end-user that has been permitted to "join" a particular shared/social shopping cart may be permitted to make certain changes to the shared/social shopping cart. Such changes may include, for example, adding a product item to, or deleting a product item from the particular shared/social shopping cart. The creator/owner of the particular shared/social shopping cart may set permissions specifying what each end-user that they allow to "join" a particular shared/social shopping cart may do with respect to the particular shared/social shopping cart. For example, in accordance with the present disclosure, a first end-user that has been allowed to "join" a particular shared/social shopping cart of a second end-user may be permitted to add or delete a product item to/from the shared/social shopping cart, may be allowed to submit or post information, and may be allowed to moderate (i.e., review and approved or reject) comments and/or reviews added by other end-users, but may not be allowed to invite other end-users to "join" the shared/social shopping cart without the approval of the creator/owner of the particular shared/social shopping cart.

For example, a first end-user of a merchant social e-commerce web site according to the present disclosure may create a shared/social shopping cart named "SCart2." The first end-user may then invite one or more other end-users to "join" the "SCart2" shared/social shopping cart. In a representative embodiment according to the present disclosure such invitations may, as in the case of an invitation to "follow" a shared/social shopping cart, be delivered using any suitable messaging mechanism including, by way of example and not limitation, an email message, a message exchanged using a social e-commerce web site, a short text messaging (SMS) or multimedia messaging service (MMS) message, or a social networking web site. Any invited end-user(s) that are connected to a social e-commerce web site upon which the shared/social shopping cart of the invitation resides may receive an immediate notification on the web pages presented to them for viewing during their online activities on the web site. Those invitees that accept the invitation to "join" (i.e., the "joined" end-users) may then be allowed to engage in various operations/actions with respect to shared/social shopping cart "SCart2" that the creator/owner may perform, including the actions allowed of end-users that have been invited to and have been accepted to "follow" "SCart2" (e.g., view and comment on the contents of the shared/social shopping cart "SCart2").

In some representative embodiments of the present disclosure, those end-users that "follow" or have "joined" the shared/social shopping cart "SCart2" will receive notifications when certain actions occur that are related to "SCart2." Examples of such actions include, by way of illustration and not limitation, when the creator/owner or any end-user that "joined" the shared/social shopping cart "SCart2" adds or removes a product item to/from "SCart2;" when another end-user of the merchant web site accepts an invitation from the owner/creator of "SCart2" or anyone that has "joined" "SCart2," to "follow" or "join" "SCart2;" and when the creator/owner of "SCart2" or anyone that "joined" or is "following" "SCart2" submits a comment on "SCart2." Further examples of such actions that result in notifications of other end-users include, by way of illustration and not limitation, when the creator/owner of "SCart2" or anyone that "joined" or is "following" "SCart2" submits a review of a product item in "SCart2;" and when the creator/owner of "SCart2" or anyone that "joined" "SCart2" places a product item from "SCart2" into their system-provided shopping cart.

As discussed above, end-users that have been granted "friend" or "join" status may be sent notifications when certain actions take place with respect to the shared/social shopping cart(s) that they are "following" or which they have "joined." For example, one or more end-users following a certain shared/social shopping cart may be notified when a product item is "added" to the particular shared/social shopping cart that is being followed by the end-user(s). Such a notification may occur automatically, according to conditions or permissions set by the creator/owner of the particular shared/social shopping cart being "followed," or by an end-user that has "joined" the shared/social shopping cart. Such a notification of the addition of a product item to a particular shared/social shopping cart may occur without any additional involvement on the part of the creator/owner of the particular shared/social shopping cart or the "joined" end-user that added the product item to the particular shared/social shopping cart, other than the act of simply adding the product item to the particular shared/social shopping cart. This applies as well to other actions or events that may occur with respect a particular shared/social shopping cart including, by way of example and not limitation, the creator/owner or a "joined" end-user removing a product item from the particular shared/social shopping cart; an end-user adding one or more product items from a first shared/social shopping cart to a second shared/social shopping cart or to a system generated shopping cart for possible purchase; adding a comment or review to a shared/social shopping cart; and sharing information about a shared/social shopping cart with other end-user(s).

When one or more product item(s) are added to a shared/social shopping cart, a graphical representation of each product item is made visible to all end-users allowed to access or view the "contents" of the shared/social shopping cart to which the particular product item was added (e.g., those end-users that "follow" or are "joined" to the shared/social shopping cart). End-user(s) may be granted permissions by the creator/owner of each shared/social shopping cart to enable the end-user(s) to, for example, view, add product items to, and remove product items from a certain shared/social shopping cart, as described above. The creator/owner may set permissions for each of the various actions than be taken with respect to a shared/social shopping cart to enable viewing of the contents by the public, in addition to those that are granted to end-users that are granted their requests to "follow" and/or "join" a given shared/social shopping cart.

In accordance with a representative embodiment of the present disclosure, the graphical representation of each product item that appears in a shared/social shopping cart may act as a link to additional information about the illustrated product. The end-user(s) permitted to access the shared/social shopping cart may select/click-on the product items visible in the shared/social shopping cart to view details of the selected product item(s). For example, selecting a product item in a shared/social shopping cart may cause the display of a pop-up window or a web page that displays various pieces of information about the selected product item. Such information may include, by way of example and not limitation, one or more of the product name, price, manufacturer, model, availability (e.g., quantity "in-stock" for purchase, or "back-ordered"), available product colors, similar or alternative product choices, shipping weight, available coupons or discounts, accessory products, and/or a means (e.g., link) to access product reviews, to name just a few examples of such product details.

End-users of merchant e-commerce web sites typically browse various portions of the web site seeking information for products of interest to them. Some of the currently visiting end-users may also be past customers that have previously sought or purchased items now being sought or shopped by other currently visiting end-users. A system supporting a social e-commerce merchant web site in accordance with the present disclosure may, for example, track the products of interest to each end-user based on, for example, product search activities, product web pages visited, length of time spent on web pages by product, and product purchases made by the visiting end-users. Some representative embodiments according to the present disclosure may use such gathered information to identify product items currently of interest to multiple end-users that are currently active on a social e-commerce web site of a merchant, and may attempt to engage those end-users having a common product interest in a dynamically created chat session. A merchant social e-commerce system as described herein, may track end-user shopping and purchase behavior, including information about web pages currently being viewed and purchase history information of end-users, to identify those end-users having interest in, or experience with, particular products or product categories. Interest in a particular type of product or a product family may, for example, be determined from web pages visited, purchases made, or explicit end-user expression of interest in a product using social indicators such as, for example, a "Want It," "Have it," "Own it" icon associated with a particular product on a product web page and selected by the end-user. By identifying those end-users that are currently active on a merchant social e-commerce web site and categorizing them into groups having common interests, a representative embodiment of the present disclosure may identify those end-users that have common interests, and may automatically contact those end-users, without intervention of the operator of the system, to determine whether those end-users are willing to take part in an end-user chat session about the product item or items in which they have interest or about which they have experience. The system may then, upon receiving an indication from a certain number of end-users expressing an interest in participating, may dynamically create an electronic chat session connecting the end-users that expressed an interest in chatting about the product in which they have common experience or interest. Such a social e-commerce web site may be supported by a system such as, for example, the computer network 100 of FIG. 1, described in more detail, below. That is, such a computer network may detect a common interest in or a relationship with a particular product by two or more end-users currently active on the network, and may propose to those two or more end-users the creation of a chat session to allow those shopping for the product of common interest, and those having experience with the product of common interest, to discuss the features, advantages, disadvantages, and other aspects of the product in which, or with which, the two or more end-users have knowledge or interest. When the end-users are finished discussing the product or topics of common interest, or after a system-imposed time limit, the dynamically-created chat session may be automatically dissolved and the intercommunication of the end-users ended.

FIG. 1 is an illustration of an exemplary computer network 100 in which a representative embodiment of the present disclosure may be practiced. The following discloses various example systems and methods for, by way of example and not limitation, operating an e-commerce platform that supports shopping as a social activity.

Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., an end-user, a customer or consumer, etc., or a sales associate, a customer service agent, and/or others to access a host system 68 and, among other things, be connected to a system supporting shared or social shopping carts, an inventory management system, a content management system, an electronic publication system, a hosted social networking site, one or more user profiles, a store directory, and/or one or more sales associates. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed, for example via a network connection. Such computer-executable instructions may, for example, also support the creation, management, and end-user access to shared/ social shopping carts, and the dynamic creation of chat sessions between end-users of a social e-commerce web site, using various elements of the computer network 100 such as, for example, the processing devices 20, 20', 20" shown in FIG. 1.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing devices 20, 20', 20". In addition, the host system 68 would generally include executable instructions for, among other things, tracking end-user shopping behavior on a merchant web site; creating, and managing end-user access to shared/social shopping carts; identifying and recommending product items, coordinating storage and retrieval of documents; maintaining social network storage of a shopping list; receiving a location of a customer or other individuals via a mobile device; and maintaining maps and layouts of buildings and geographic areas. The host system 68 may include executable instructions for calculating directions or routes within buildings and geographic areas; searching, retrieving, and analyzing web-based content; managing operating rules and communication with user devices used by participants, for receiving a request for a service call center connection from either a customer or a sales associate. The host system 68 may also include executable instructions to perform routing of a received request via a distributed mobile video call center; dynamically creating chat sessions among end-users having experience or interest in common product items, providing a service call infrastructure for providing the requestor with a distributed customer service experience, and for an e-commerce promotions platform for administering e-commerce promotions, such as sweepstakes, contests, giveaways, and/or instant wins.

Communications between the processing devices 20, 20', 20" and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

Figure 2:
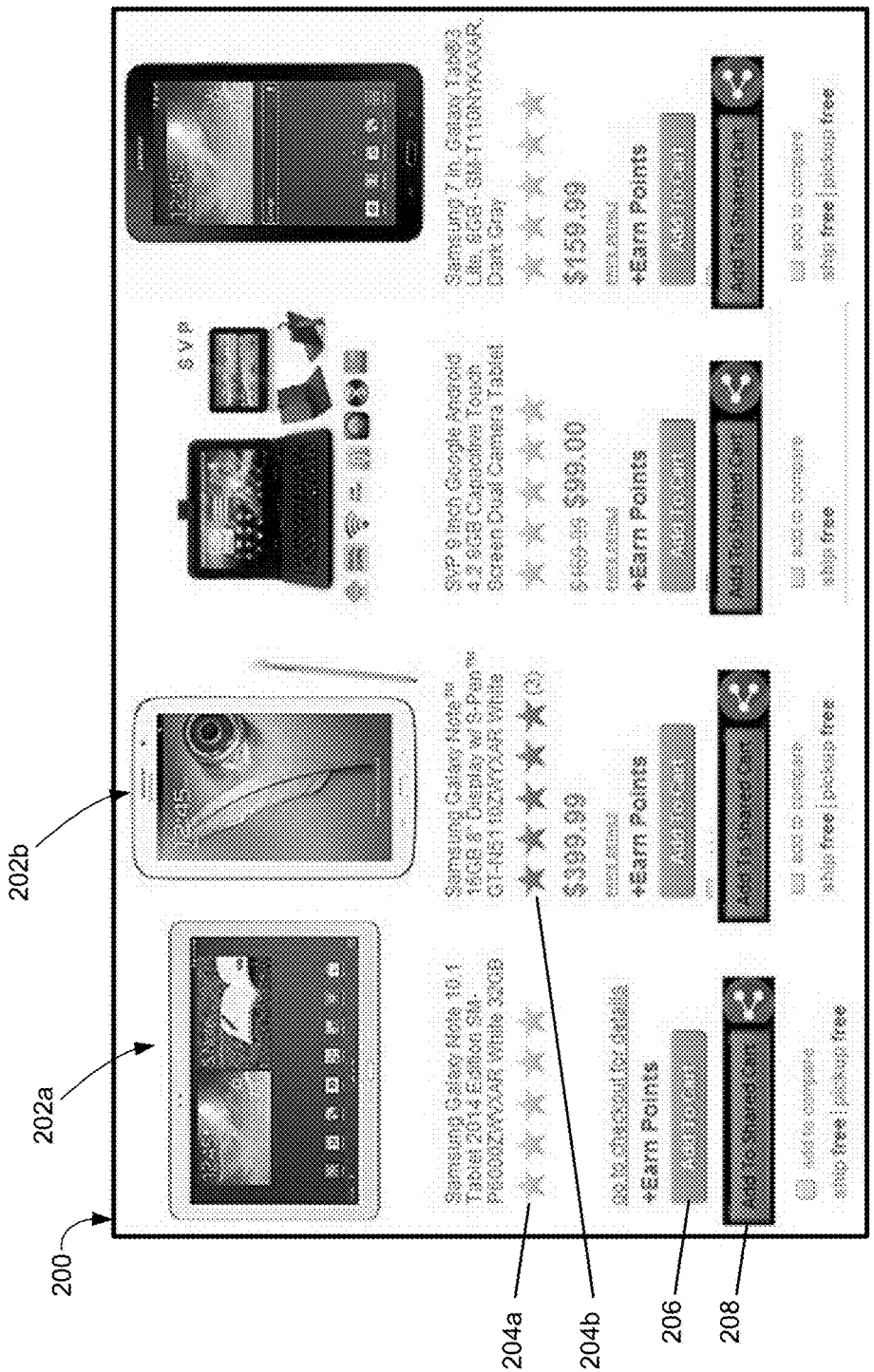
FIG. 2 is an illustration of a screen image of an exemplary web page showing a number of products available via an e-commerce web site, in accordance with a representative embodiment of the present disclosure.

FIG. 2 is an illustration of a screen image of an exemplary web page 200 showing a number of products available via an e-commerce web site, in accordance with a representative embodiment of the present disclosure. The web page 200 may, for example, be the result of a search of the products available on an e-commerce web site. The example of FIG. 2 shows groups of information for four different products, each group of product information including a small image of the respective product and a short description of the product. For example, FIG. 2 shows product information 202a that illustrates a tablet computer, with an accompanying review indicator 204a representing a lack of favorable reviews when compared to the reviews indicator 204b of product information 202b. Some of the groups of information for a product include pricing information, and information related to the ability of the end-user to earn reward points with the purchase of a particular product. Each of the groups of product information also include an "Add to cart" button, like "Add to cart" button 206 of product information 202a, which enables the end-user to add the associated product to the electronic shopping cart automatically provided by the system supporting the e-commerce web site of the merchant selling the illustrated products. In accordance with a representative embodiment of the present disclosure, each of the groups of product information also include an "Add to shared cart" button, like the "Add to shared cart" button 208 of product information 202a, which permits the end-user to add the product represented by product information 202a to a shared/social shopping cart of the current end-user, as discussed above in greater detail. As discussed above, end-user selection of the "Add to shared cart" button 208 may result in the transmission of a notification of the event to those end-users that "follow" the shared/social shopping cart.

Figure 3:
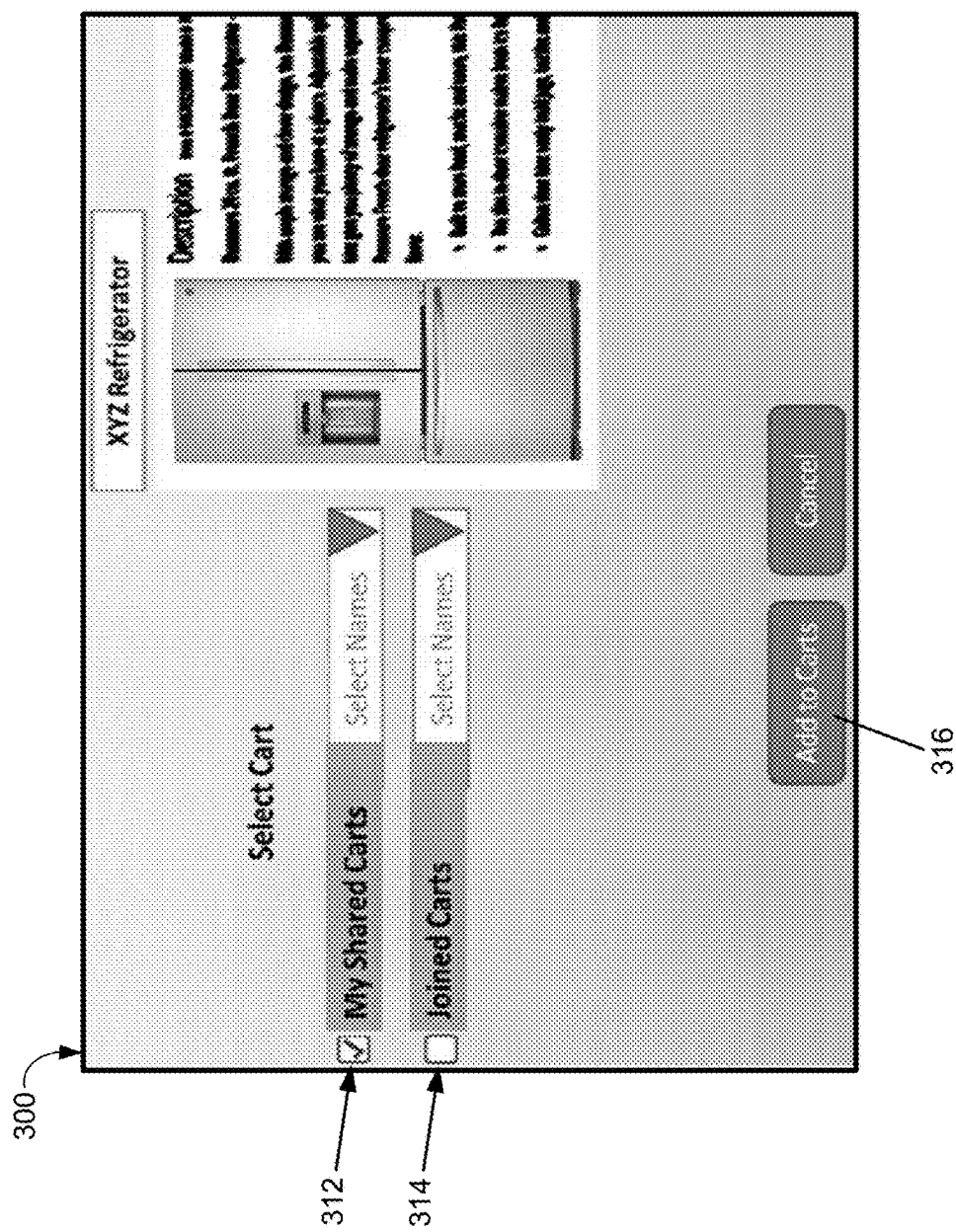
FIG. 3 is an illustration of a screen image of an exemplary pop-up window that may be displayed upon end-user selection of an "Add to shared cart" user interface element such as, for example, the "Add to shared cart" button of FIG. 2, in accordance with a representative embodiment of the present disclosure.

FIG. 3 is an illustration of a screen image of an exemplary pop-up window 300 that may be displayed upon end-user selection of an "Add to shared cart" user interface element such as, for example, the "Add to shared cart" button 208 of FIG. 2, in accordance with a representative embodiment of the present disclosure. In the example illustrated in FIG. 3, the end-user may choose to add the product corresponding to the product information 202 of FIG. 2 to a shared shopping cart, by selecting the "Add to shared cart" button 208. The pop-up window 300 is provided to permit the end-user to add the selected product to one or more shopping carts by checking one or more of the checkboxes for a shared/social shopping cart selected using the pull-down list for "My Shared Carts" 312, and/or to a shared/social shopping cart selected using the pull-down list for "Joined Carts" 314, upon selection of the "Add to carts" button 316. If no shared/social shopping carts are available for the end-user, a system in accordance with the present disclosure may present to the end-user a pop-up window, such as that illustrated in the example of FIG. 4, to enable the end-user to create their own new shared/social shopping cart, which is discussed in further detail, below.

Figure 4:
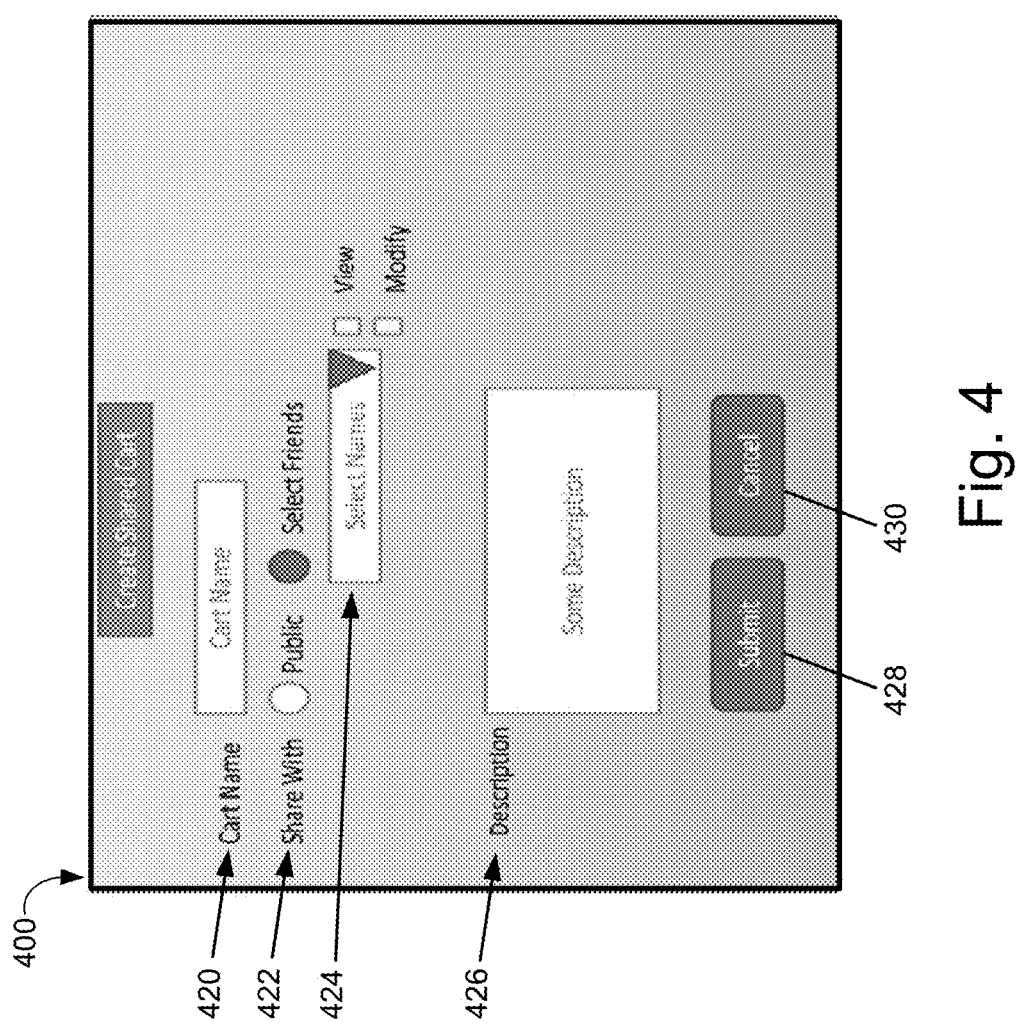
FIG. 4 is an illustration of a screen image of an exemplary pop-up window that may be displayed upon end-user selection of an "Add to shared cart" user interface element such as, for example, the "Add to shared cart" button of FIG. 2, when no shared/social carts are currently available for the end-user, in accordance with a representative embodiment of the present disclosure.

FIG. 4 is an illustration of a screen image of an exemplary pop-up window 400 that may be displayed upon end-user selection of an "Add to shared cart" user interface element such as, for example, the "Add to shared cart" button 208 of FIG. 2, when no shared/social carts are currently available for the end-user, in accordance with a representative embodiment of the present disclosure. The pop-up window 400 includes a "Cart name" text field 420, to permit the end-user to provide a unique and/or personal name for the shared/social shopping cart to be created, and a group of "Share with" radio buttons 422, to enable the end-user to select whether the shared/social shopping cart is to be made accessible/visible only to selected friends, or to the public community of end-users of the social e-commerce system supporting the merchant web site. A pull-down list 424 is also provided to allow the end-user to specify which of their "Friends" may be allowed to "follow" the shared/social shopping cart currently being created. A "Description" text field 426 is also provided, to permit the end-user to describe the nature of the share/social shopping cart, which may be made visible to those searching for share/social shopping cart that they may wish to "follow" or "join." When the end-user has provided the above-mentioned information, the end-user may complete creation of the shared/social shopping cart by selecting the "Submit" button 428, or may abort the creation by selecting the "Cancel" button 430.

Figure 5:
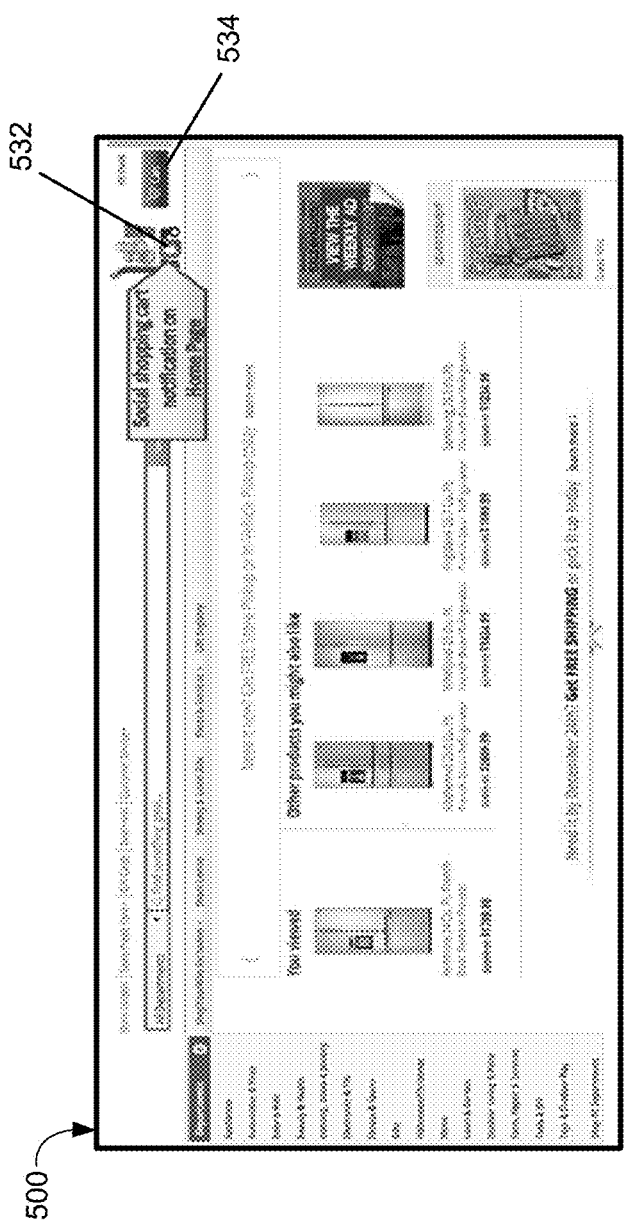
FIG. 5 is an illustration of a screen image of an exemplary web page that may be displayed following end-user login to a merchant social e-commerce web site, in accordance with a representative embodiment of the present disclosure.

FIG. 5 is an illustration of a screen image of an exemplary web page 500 that may be displayed following end-user login to a merchant social e-commerce web site, in accordance with a representative embodiment of the present disclosure. The example web page of FIG. 5 includes a "Cart" user interface element 534, to permit the end-user access to the contents of a standard shopping cart automatically provided by the system supporting the merchant web site. The system-provided shopping cart may be used by the end-user as a repository into which to place the product items selected for purchase. As previously discussed above, such a system provided shopping cart may be used to collect items for purchase via a "checkout" process, and access to information about the contents of such a system-provided shopping cart is typically not available to anyone but the end-user that logged in to the merchant social e-commerce web site. Therefore, visibility of the product items to such a system-provided cart is limited to the end-user that logged-in to the merchant web site.

In accordance with a representative embodiment of the present disclosure, the example web page of FIG. 5 also includes a user interface element 532 that acts as an indicator and access point for the shared/social shopping carts of the end-user. Such a user interface element may indicate to the end-user that shared/social shopping cart notifications are waiting for their review, and provide access to the shared/social shopping carts of the end-user.

Figure 6:
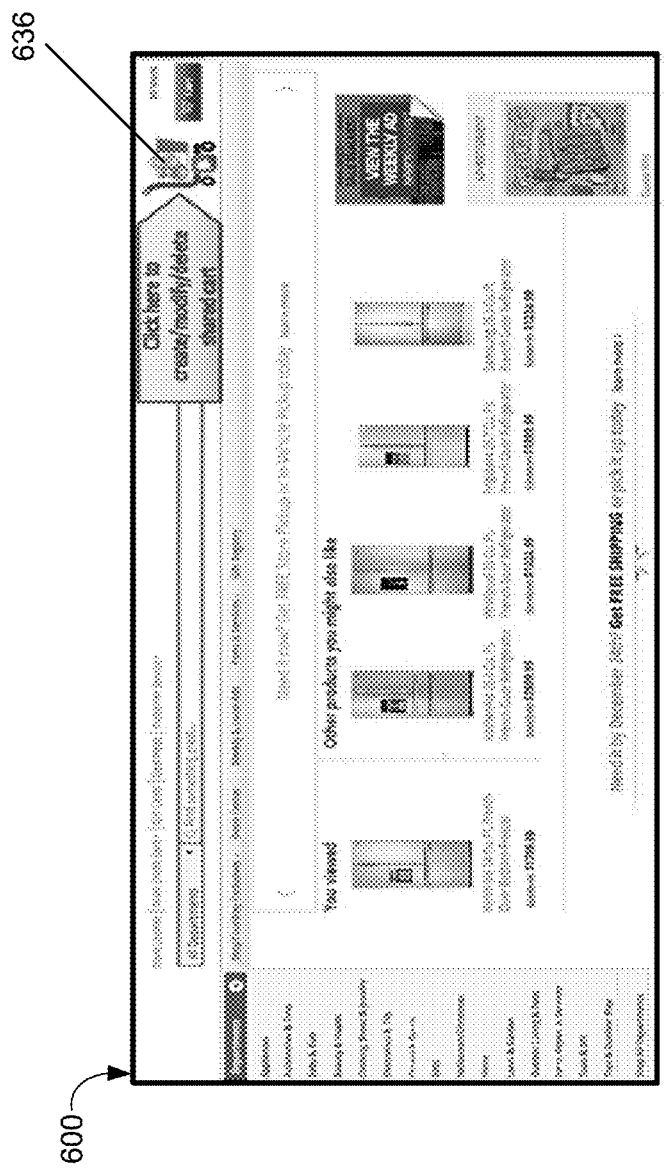
FIG. 6 is an illustration of a screen image of another exemplary web page that may be displayed following end-user login to a merchant social e-commerce web site, in accordance with a representative embodiment of the present disclosure.

FIG. 6 is an illustration of a screen image of another exemplary web page 600 that may be displayed following end-user login to a merchant social e-commerce web site, in accordance with a representative embodiment of the present disclosure. The example web page 600 of FIG. 6 illustrates a user interface element 636 that guides the end-user to click on the shared/social shopping cart icon of the user interface element 636, to create, modify, or delete shared/social shopping carts of the end-user. Selecting/clicking on user interface element 636 may then cause the display of the pop-up window 800 of FIG. described in greater detail, below.

Figure 7:
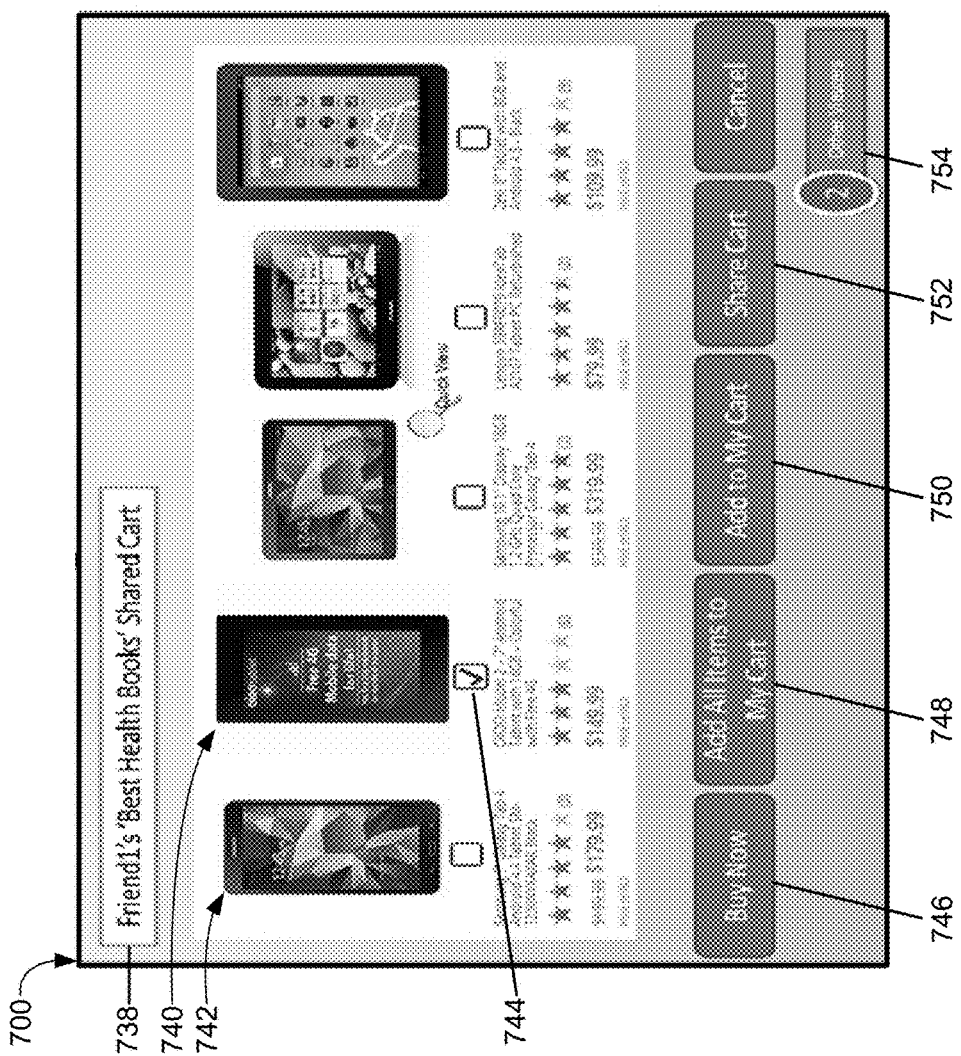
FIG. 7 is an illustration of a screen image of an exemplary pop-up window showing the contents of a shared/social shopping cart selected by the end-user for viewing, in accordance with a representative embodiment of the present disclosure.

FIG. 7 is an illustration of a screen image of an exemplary pop-up window 700 showing the contents of a shared/social shopping cart selected by the end-user for viewing, in accordance with a representative embodiment of the present disclosure. The pop-up window 700 includes a text field 738 identifying the name of the selected shared/social shopping cart, and product information for five example products previously added to the named shared/social shopping cart. In the illustration of FIG. 7, the information for each of the five illustrated product items includes a small image of the product, a brief description of the product, review information representing ratings for each product, a price field, and a product selection checkbox to permit the end-user to select the corresponding product. The product information 742 illustrates an example product having an unchecked product selection checkbox, while the product selection checkbox 744 of product information 740 is checked. In the example of FIG. 7, the user may check the product selection checkbox of each product that they wish to then purchase using the "Buy Now" button 746, or that they may wish to add to their own shared/social shopping cart using the "Add to My Cart" button 750. In a representative embodiment of the present disclosure, selecting the "Buy Now" button 746 may copy product information for all products in a shared/social shopping cart having a checked product selection checkbox to the system-provided electronic shopping cart, for purchase.

The end-user may choose to add all of the illustrated product items shown in the example of FIG. 7 to their own shared/social shopping cart, regardless of the status of the associated product selection checkbox, by selecting the "Add All Items to My Cart" button 748, and may choose to share the contents of the illustrated shared/social shopping cart with another end-user by selecting the "Share Cart" button 752. The end-user may cancel any further activity with the pop-up window of FIG. 7 by selecting the "Cancel" button. A user interface element 754 is provided in the illustrated example, to indicate to the end-user, the total number of end-users of the merchant social e-commerce web site currently viewing the contents of the indicated shared/social shopping cart.

Figure 8:
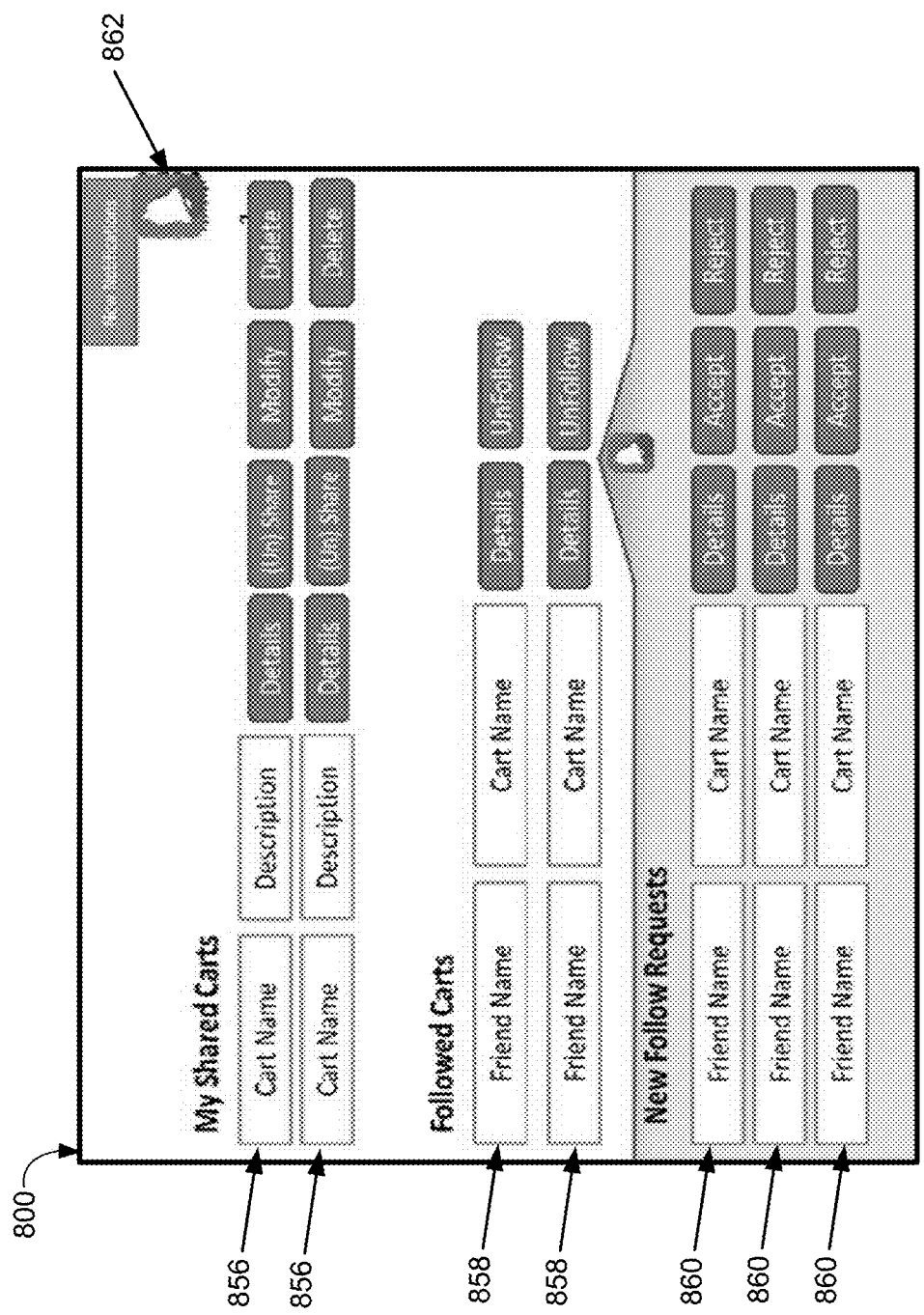
FIG. 8 is an illustration of a screen image of an exemplary pop-up window identifying the names of the shared/social shopping carts of an end-user, the names of the shared/social shopping carts being followed by the end-user, and a list notifying the end-user of the pending requests from other end-users to "follow" various shared/social shopping carts of the end-user, in accordance with a representative embodiment of the present disclosure.

FIG. 8 is an illustration of a screen image of an exemplary pop-up window 800 identifying the names of the shared/social shopping carts of an end-user, the names of the shared/social shopping carts being followed by the end-user, and a list notifying the end-user of the pending requests from other end-users to "follow" various shared/social shopping carts of the end-user, in accordance with a representative embodiment of the present disclosure. As shown in the example of FIG. 8, the pop-up window 800 includes a list of two shared/social shopping carts 856 showing the shared/social shopping cart name, a description, and a "Details" button to permit the end-user to view additional information about the selected shared/social shopping card. Each entry in the list of shared/social shopping carts 856 also includes an "(Un) Share" button to permit the end-user to identify another end-user that is to be allowed to "follow" the named shared/social shopping cart or to end sharing of the named shared/social shopping cart, a "Modify" button to permit the end-user to make changes to the named shared/social shopping cart, and a "Delete" button to permit the end-user to delete the named shared/social shopping cart from the list.

The example of FIG. 8 also includes a list of shared/social shopping carts 858 of other end-users of the merchant social e-commerce web site currently being "followed" by the end-user. Information is also shown that identifies the creator/owner or "joined" end-user ("Friend Name") that permitted the end-user to "follow" the name shared/social shopping cart, the name of the shared/social shopping cart ("Cart Name"), and an "Unfollow" button and a "Details" button, to permit the end-user to end their "following" of the named shared/social shopping cart or to view details about the named shared/social shopping cart, respectively.

In addition, the example of FIG. 8 includes a list of notifications 860 of requests from other end-users of the merchant social e-commerce web site of the present disclosure that have requested to "follow" a shared/social shopping cart of the end-user. The names of the other end-users ("Friend Name") and the name of the shared/social shopping cart that the other end-user wishes to "follow" ("Cart Name") are provided, along with "Accept," "Reject," and "Details" buttons that permit the end-user to accept or reject the request of each of the other end-users to "follow," or to display details of the requests by the other end-users, respectively. A notifications indicator 862 may be displayed as an indication of the receipt of new "follow" requests, and in some representative embodiment in accordance with the present disclosure, may show the number of new "follow" requests.

Figure 9:
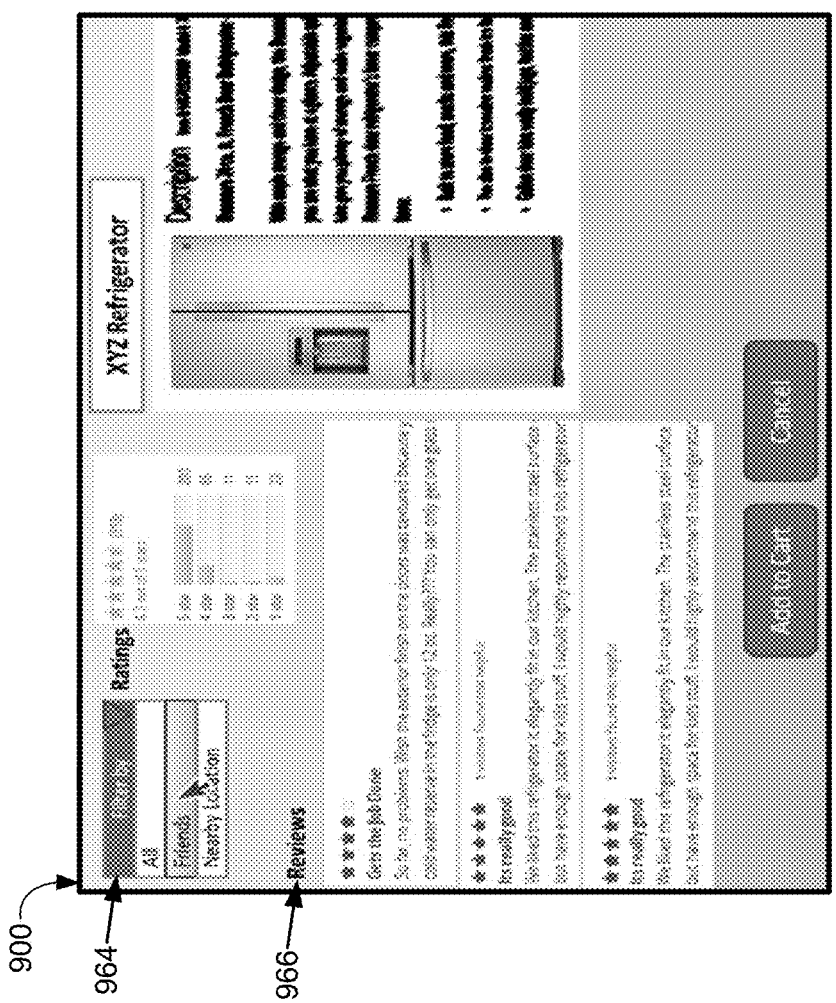
FIG. 9 is an illustration of a screen image of an exemplary pop-up window showing a listing of product reviews for an illustrated product item that may be selected using a filter, in accordance with a representative embodiment of the present disclosure.

FIG. 9 is an illustration of a screen image of an exemplary pop-up window 900 showing a listing of product reviews 966 for an illustrated product item that may be selected using a filter 964, in accordance with a representative embodiment of the present disclosure. The filter 964 of the example of FIG. 9 enables an end-user to separate, distinguish, or segment the product reviews of the friends of the end-user from the all of the reviews of the illustrated product item submitted to a social e-commerce system of a merchant. As previously described above, a system in accordance with the present disclosure may store and use information about the end-user that identifies other end-users of the system that are known to, and may be classified by the end-user as "friends" of the end-user, in order to separate, segment, or distinguish product reviews that are submitted by friends of the end-user, from those submitted by other end-users. A system in accordance with the present disclosure may receive information from end-users that identifies, for each particular end-user of the system, a group of one or more other end-users of the system that have a "friend" relationship with each particular end-user. When requested to provide product reviews submitted to the system by end-users, a system in accordance with the present disclosure may compare the identity of the end-user submitting each product review against those end-users having a "friend" relationship with the particular end-user requesting the product reviews. Those reviews submitted by end-users having a "friend" relationship with the requesting end-user may be distinguished from all other reviews of the product of interest to the end-user, by being segmented, separated, or otherwise visibly recognizable as having been submitted by a "friend" of the end-user requesting the reviews for a particular product. In this manner, an end-user may be presented with product reviews from end-users known to him/her, which provides to the end-user requesting product review information, details suggestive of the reliability and veracity of the product reviews offered up by the system.

Figure 10:
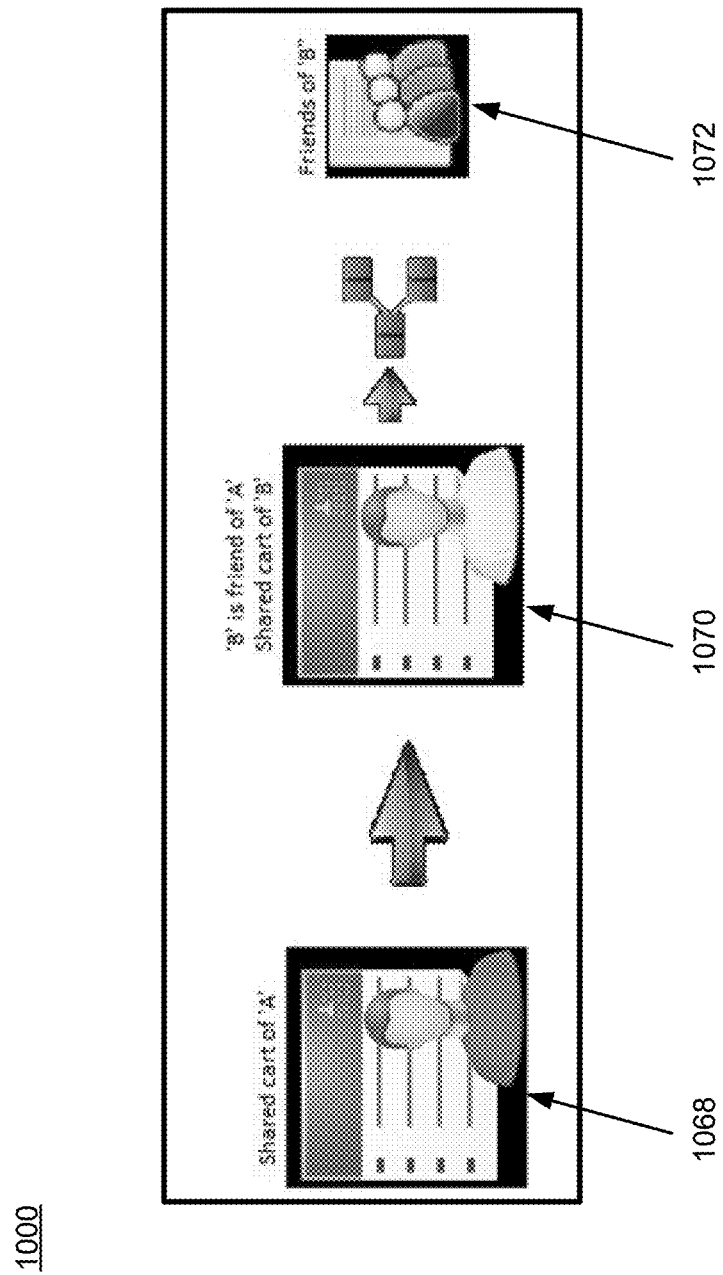
FIG. 10 is a block diagram that illustrates the cascading social effect of the sharing of shared/social shopping carts in a population of end-users of a system supporting a social e-commerce web site of a merchant, in accordance with a representative embodiment of the present disclosure.

FIG. 10 is a block diagram 1000 that illustrates the cascading social effect of the sharing of shared/social shopping carts in a population of end-users of a system supporting a social e-commerce web site of a merchant, in accordance with a representative embodiment of the present disclosure. The diagram 1000 of FIG. 10 shows a first end-user 'A' that has granted a request from end-user 'B' to "follow" a shared/social shopping cart of end-user 'A.' As previously discussed above, notifications of the actions of end-user 'A' upon a shared/social shopping cart of end-user 'A' such as, by way of example and not limitation, the addition or the removal of a product item to/from the shared/social shopping cart of end-user 'A,' may be sent to all end-users that "follow" the shared/social shopping cart of end-user 'A.' It should be noted, however, that end-user 'B' may also permit an end-user 'C' to "follow" a shared/social shopping cart of end-user "B," and that notifications of actions of end-user 'A' upon the shared/social shopping cart of end-user 'A' "followed" by end-user 'B' may result in notifications also being sent to end-user 'C' that "follows" the shared/social shopping cart of end-user 'B.' This may occur, for example, when end-user 'B' has included in their own shared/social shopping cart, items that were copied/shared from the shared/social shopping cart of end-user 'A.' Because a similar sharing relationship may have been established between product items in the shared/social shopping cart of end-user 'B' and the shared/social shopping cart of end-user 'C,' the notifications originating with the actions of end-user 'A' may cascade to other end-users through a chain of sharing/socialization of shopping carts of the present disclosure. Additional levels of user sharing are possible, and may further the cascading of notifications, and therefore, social involvement of a larger number of end-users in the shopping activities of a given end-user.

Figure 11:
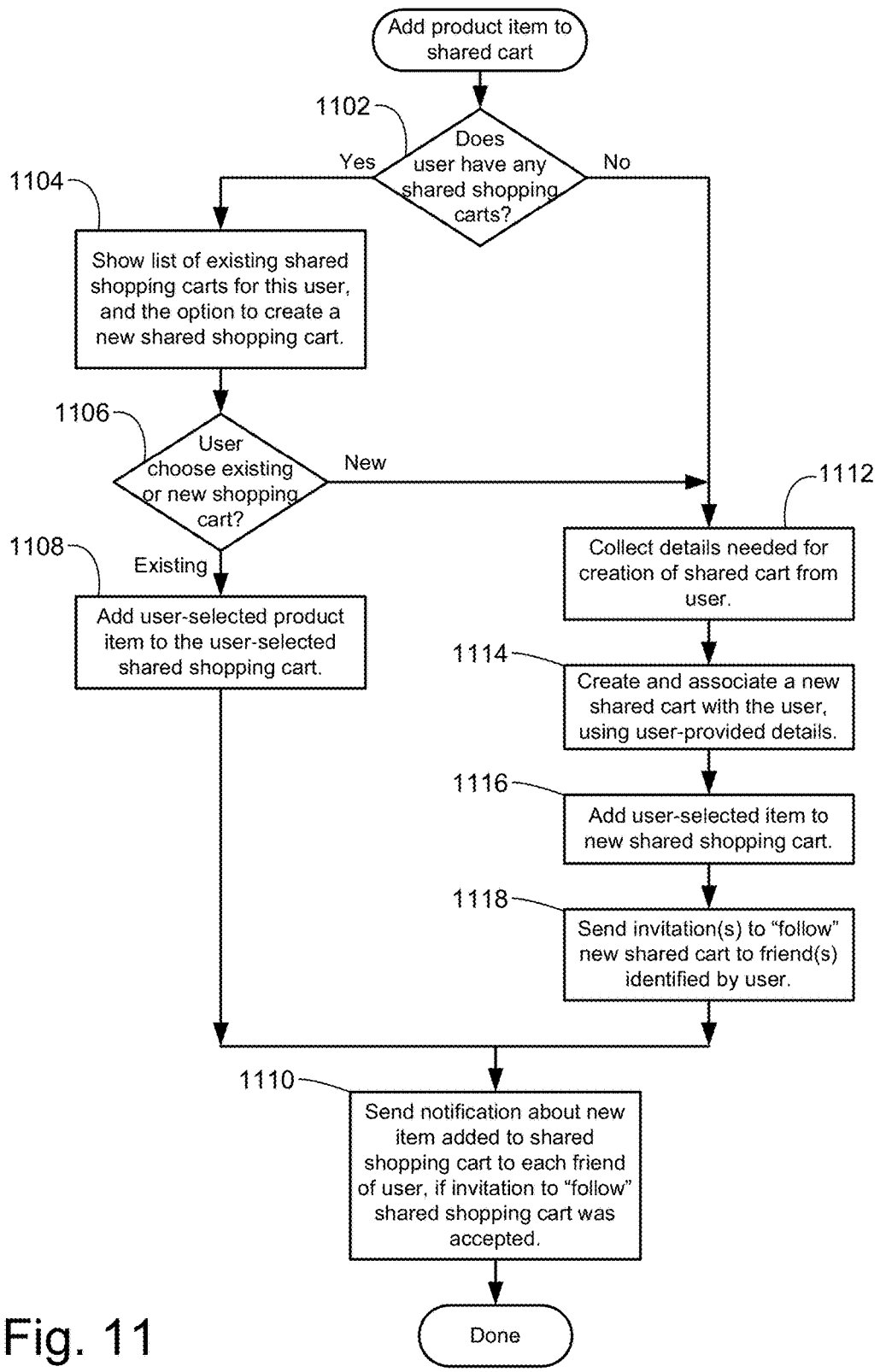
FIG. 11 is a flowchart of an example method of adding a product item to a shared/social shopping cart of an end-user of a social e-commerce web site, in accordance with a representative embodiment of the present disclosure.

FIG. 11 is a flowchart of an example method of adding a product item to a shared/social shopping cart of an end-user of a social e-commerce web site, in accordance with a representative embodiment of the present disclosure. The following discussion may make reference to the elements of the computer network of FIG. 1 and the various example screen images of FIGS. 2-10, discussed above. It should be noted that although the discussion that follows addresses details of adding an end-user selected product item to a shared/social shopping cart, aspects of FIG. 11 may be applicable to other actions of an end-user that is the creator/owner or "joined" end-user of a shared/social shopping cart in accordance with the present disclosure. The actions of the flowchart of FIG. 11 may be performed by, for example, elements of the computer network 100 of FIG. 1 such as the host system 68.

The method depicted in FIG. 11 begins at decision block 1102, following the occurrence of an end-user request to add a product item to a shared/social shopping cart in accordance with the present disclosure. This may occur when, for example, an end-user selects the "Add to Shared Cart" button 208 of FIG. 2. At decision block 1102, a determination is made as to whether the end-user currently has any shared/social carts available to which the selected product item may be added. If no shared/social shopping carts exist for the end-user, the method continues at block 1112, where the system performing the method of FIG. 11 collects details needed for the creation of a shared/social shopping cart for this end-user. In some representative embodiments of the present disclosure, a user interface such as, for example, pop-up window 400 of FIG. 4 may be presented to the end-user to collect the needed information. Once the needed information has been collected, the method of FIG. 11 then, at block 1114, creates and associates a new shared/social shopping cart with the current end-user.

Next, at block 1116, the system performing the method of FIG. 11 is directed to add the end-user-selected product item to the newly created share/social shopping cart, and then, at block 1118, send invitations to "follow" the newly created shared/social shopping cart to "friends" (e.g., those other end-users that "follow" the end-user on the social e-commerce system of the merchant) of the end-user. The method of FIG. 11 then continues at block 1110, where the system supporting the social e-commerce web site of the merchant, at some later point in time, sends notifications about various actions of the creator/owner upon the newly created shared/social shopping cart to each end-user that accepted the invitation to "follow" the newly created shared/social shopping cart. The notifications sent automatically by a system in accordance with the present disclosure enables the "following" end-users to keep abreast of the changes to the shared/social shopping cart and the social exchange surrounding the product items that are added, removed, reviewed, commented-on, purchased, shared, and about which various social signals may have been expressed (e.g., "Like," "Want it," "Have it," "Own it.").

If, at decision block 1102, it is determined that the end-user currently has at least one shared/social cart available to which the selected product item may be added, the method of FIG. 11 may show a list of existing shared/social shopping carts for the current end-user, along with an option to create a new shared/social shopping cart. If, at decision block 1106, the end-user chooses to create a new shared/social shopping cart, the method continues at block 1112, described above. If, however, the user chooses to add the product item to an existing shared/social shopping cart, the system performing the method of FIG. 11, at block 1108, may add the product item to the existing shared/social shopping cart chosen by the end-user. The method then continues at block 1110, described above.

Figure 12:
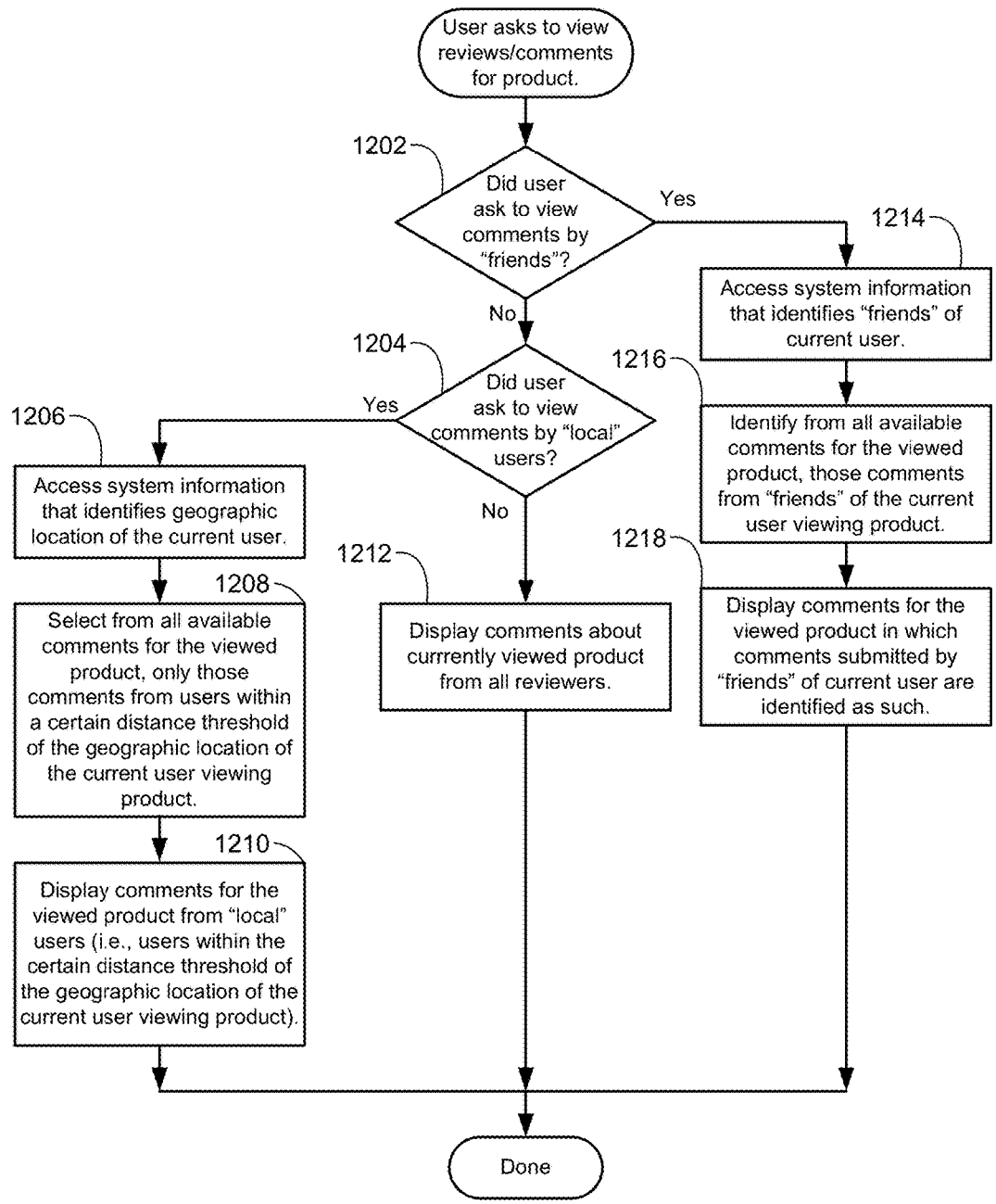
FIG. 12 is a flowchart illustrating an example method of processing a request by an end-user of a social e-commerce web site to view review and/or comments for a particular product item, in accordance with a representative embodiment of the present disclosure.

FIG. 12 is a flowchart illustrating an example method of processing a request by an end-user of a social e-commerce web site to view review and/or comments for a particular product item, in accordance with a representative embodiment of the present disclosure. The following discussion may make reference to the elements of the computer network of FIG. 1 and elements of the various example screen images of FIGS. 2-10, previously discussed above. The actions of the flowchart of FIG. 12 may be performed by, for example, elements of the computer network 100 of FIG. 1 such as the host system 68.

Performance of actions of the method illustrated in FIG. 12 begin at decision block 1202, following an end-user action that represents a requesting to view reviews and/or comments for a particular product item. Such a request may begin, for example, as a result of the end-user selecting/clicking-on a user interface element such as, by way of example and not limitation, the reviews indicators 204a, 204b of FIG. 2. Further information about the request may be gathered by a system of the present disclosure via a user interface such as, for example, the pop-up window 900 of FIG. 9. In the example of FIG. 9, an end-user may indicate, via the pull-down list of filter 964, that the end-user wishes to see reviews/comments from "All" submitters, only review submissions by "Friends" of the end-user, or only the reviews/comments of those submitters within a certain distance threshold of the end-user (i.e., a "local" reviewer/commenter). If, at decision block 1202, it is determined that the end-user wishes to view comments from "Friends," the method of FIG. 12 continues at block 1214, where the system performing the method may access system information that stores information about "Friends" of the current end-user. The term "friend" may be used herein to refer to those end-user members of a social network or end-users of a social e-commerce system that have requested to "follow" (i.e., to be kept apprised or informed of the activities and actions of) a particular end-user of the system.

Next, at block 1216, the method may cause a social e-commerce of the present disclosure to identify, among all available comments/reviews submitted for the particular product item, those specific comments/reviews submitted by "friends" of the current end-user making the request (i.e., the end-user viewing the particular product item, and that requested reviews/comments submitted by their friends). The method of FIG. 12 may then, at block 1218, display to the end-user, those reviews/comments submitted by those known to the system as the "friends" of the end-user. Following the display at block 1218, the method of FIG. 12 ends.

It should be noted that variations of this concept include one in which the system automatically (i.e., without specific end-user or operator intervention or request) segments, separates, labels or marks, or otherwise distinguishes those product reviews/comments/submissions by one or more of a particular group of individuals having a particular relationship to the end-user requesting product review or comment information (in the present example the "friends of the end-user), in a listing or display of all reviews/comments presented to the end-user. It should also be noted that the relationship used to select reviews/comments/submissions is not limited to the "friend" relationship of the present example, but may include any suitable relationship (by way of example and not limitation, a co-worker, a relative, an immediate family member). It should be further noted that although the present disclosure provide examples in terms of "product items," the concept of the present disclosure apply equally to services, or other elements.

If, at decision block 1202, it is determined that the end-user does not wish to restrict their viewing to comments from "Friends," the method of FIG. 12 continues at decision block 1204, where a determination is made as to whether the end-user wishes to view product reviews/comments/submissions from "local" submitters. That is, the end-user may be asking to view product reviews/comments/submissions submitted by other end-users of the social e-commerce system that are "local" to the end-user. That is, the end-user may be asking for product reviews/comments/submissions from end-users located within, for example, a certain distance threshold of the location of the end-user requesting the product reviews/comments/submissions, a certain geographic region chosen by the end-user, or a certain government jurisdiction (i.e., city, town, village, state, etc.) specified by the end-user. If, at decision block 1204, it is determined that the end-user is requesting product reviews/comments/submissions from a "local" submitter, the method continues at block 1206, where the system performing the method of FIG. 12 accesses information identifying a geographic location of the end-user. Next, at block 1208, the method selects from all available product reviews/comments/submissions, those reviews/comments/submissions for the particular product of interest that were submitted by end-users located within the certain distance threshold, geographic region, or government jurisdiction as the end-user requesting the product reviews/comments/submissions. The method of FIG. 12 then, at block 1210, displays the reviews/comments/submissions selected for the end-user from all available reviews/comments/submissions for the particular product item. The method of FIG. 12 then ends.

If, at decision block 1204, it is determined that the end-user is not requesting product reviews/comments/submissions from a "local" submitter, the method continues at block 1212, where the system performing the method of FIG. 12 causes all or a certain displayable number of the set of all reviews/comments/submissions available for the particular product item, to the end-user. The method of FIG. 12 then ends.

Aspects of the present disclosure may be found in a method of operating a first computer network to support shopping as a social activity of a plurality of end-users of the first computer network. Such a method may comprise creating on the first computer network, at the request of a first end-user of the plurality of end-users, a repository for storing product information for each of a plurality of product items; and receiving, from the first end-user, information identifying one or more other end-users of the plurality of end-users. The method may also comprise, in response to a first request received from a communication device of the first end-user, transmitting product information for a particular product item to the communication device of the first end-user; and in response to a second request from the first end-user, performing a particular action upon the repository of product information. The method may further comprise, in response to performance of the action by the first computer network upon the repository or product information, transmitting, to a communication device of each of the one or more other end-users, a notification of the particular action performed upon the repository of product information by the first end-user and information identifying the first end-user.

In a representative embodiment of the present disclosure, the particular action performed upon the repository of product information may comprise one of adding to or removing from the repository of product information, information for the particular product. The first computer network may manage access by the one or more other end-users to the product information in the repository of product information, according to permissions provided by the first end-user, and the first computer network may function, at least in part, as an Internet web site of a merchant that supports online shopping by the one or more other end-users. The notification of the particular action performed upon the repository of product information by the first end-user and the information identifying the first end-user may be transmitted to the communication device of each of the one or more other end-users, from the first computer network to user accounts of the one or more other users, via a second computer network separate from the first computer network. In some representative embodiments of the present disclosure, the second computer network may comprise a social networking web site that enables communication between members of an online community of family, friends, colleagues, and other personal contacts. The first computer network may maintain one or more personal reviews of product items and information identifying a corresponding end-user of the plurality of end-users that submitted each of the one or more personal reviews of product items. In addition, the method may comprise, in response to a request from the first end-user, providing to the first end-user by selecting from the one or more personal reviews of product items, a set of personal reviews of product items submitted by particular end-users of the plurality of end-users, wherein the particular end-users are known to the first end-user.

Further aspects of the present disclosure may be found in a system for a first computer network to support shopping as a social activity of a plurality of end-users of the first computer network, where such a system may comprise at least one processor for communicatively coupling to communication devices of each of the plurality of end-users, and where the at least one processor is operable to, at least, perform the action of the method described above.

Yet other aspects of the present disclosure may be seen in a non-transitory computer readable medium having a plurality of code sections, where each code section may comprise a plurality of instructions executable by one or more processors, and where the executable instructions may cause the one or more processors to perform the steps of a method of operating a first computer network to support shopping as a social activity of a plurality of end-users of the first computer network, as described above.

Accordingly, aspects of the disclosure may be realized in hardware, software, firmware or a combination thereof. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present disclosure may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present disclosure may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present disclosure.

While the disclosure has described certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method of operating a first computer network to support shopping as a social activity of a plurality of end-users of the first computer network, the method comprising:

creating on the first computer network, for a first end-user of the plurality of end-users, a first social shopping cart for storing product information for each of a plurality of product items, wherein a second end-user of the plurality of end-users has permission to view the contents of the first social shopping cart;

creating on the first computer network, for the second end-user of the plurality of end-users, a second social shopping cart for storing product information for each of a plurality of product items, wherein a third end-user of the plurality of end-users has permission to view the contents of the second social shopping cart, and the second social shopping cart automatically includes the contents of the first social shopping cart;

in response to a request from the first end-user, performing a particular action upon the first social shopping cart; and in response to performance of the particular action by the first computer network upon the first social shopping cart, automatically:

sending a notification of the particular action performed upon the first social shopping cart to a communication device of the second end-user;

performing the particular action upon the second social shopping cart;

sending a notification of the particular action performed upon the second social shopping cart to a communication device of the third end-user.

2. The method according to claim 1, wherein the particular action performed upon the first social shopping cart comprises one of adding to or removing from the first social shopping cart, information for a particular product.

3. The method according to claim 1, wherein the first computer network manages access by the second end-user to the first social shopping cart according to permissions provided by the first end-user.

4. The method according to claim 1, wherein the first computer network functions, at least in part, as an Internet web site of a merchant that supports online shopping by the plurality of end-users.

5. The method according to claim 1, wherein the notification of the particular action performed upon the first social shopping cart is transmitted from the first computer network to a user account of the second end-user via a second computer network separate from the first computer network.

6. The method according to claim 5, wherein the second computer network comprises a social networking web site that enables communication between members of an online community of family, friends, colleagues, and other personal contacts.

7. The method according to claim 1, wherein the first computer network maintains one or more personal reviews of product items and information identifying a corresponding end-user of the plurality of end-users that submitted each of the one or more personal reviews of product items, and wherein the method further comprises:

in response to a request from the first end-user, providing to the first end-user by selecting from the one or more personal reviews of product items, a set of personal reviews of product items submitted by particular end-users of the plurality of end-users, wherein the particular end-users are members of a social networking group to which the first end-user belongs.

8. A system for a first computer network to support shopping as a social activity of a plurality of end-users of the first computer network, the system comprising:
at least one processor for communicatively coupling to communication devices of each of the plurality of end-users, the at least one processor operable to, at least:
create on the first computer network, for a first end-user of the plurality of end-users, a first social shopping cart for storing product information for each of a plurality of product items, wherein a second end-user of the plurality of end-users has permission to view the contents of the first social shopping cart;
create on the first computer network, for the second end-user of the plurality of end-users, a second social shopping cart for storing product information for each of a plurality of product items, wherein a third end-user of the plurality of end-users has permission to view the contents of the second social shopping cart, and the second social shopping cart automatically includes the contents of the first social shopping cart;
in response to a request from the first end-user, perform a particular action upon the first social shopping cart; and
in response to performance of the particular action by the first computer network upon the first social shopping cart, automatically:
send a notification of the particular action performed upon the first social shopping cart to a communication device of the second end-user;
perform the particular action upon the second social shopping cart;
send a notification of the particular action performed upon the second social shopping cart to a communication device of the third end-user.

9. The system according to claim 8, wherein the particular action performed upon the first social shopping cart comprises one of adding to or removing from the first social shopping cart, information for a particular product.

10. The system according to claim 8, wherein the first computer network manages access by the second end-user to the first social shopping cart according to permissions provided by the first end-user.

11. The system according to claim 8, wherein the first computer network functions, at least in part, as an Internet web site of a merchant that supports online shopping by the plurality of end-users.

12. The system according to claim 8, wherein the notification of the particular action performed upon the first social shopping cart is transmitted to from the first computer network to a user account of the second end-user via a second computer network separate from the first computer network.

13. The system according to claim 12, wherein the second computer network comprises a social networking web site that enables communication between members of an online community of family, friends, colleagues, and other personal contacts.

14. The system according to claim 8, wherein the first computer network maintains one or more personal reviews of product items and information identifying a corresponding end-user of the plurality of end-users that submitted each of the one or more personal reviews of product items, and wherein the method further comprises:
in response to a request from the first end-user, providing to the first end-user by selecting from the one or more personal reviews of product items, a set of personal reviews of product items submitted by particular end-users of the plurality of end-users, wherein the particular end-users are members of a social networking group to which the first end-user belongs.

15. A non-transitory computer readable medium having a plurality of code sections, each code section comprising a plurality of instructions executable by one or more processors, the executable instructions causing the one or more processors to perform the steps of a method of operating a first computer network to support shopping as a social activity of a plurality of end-users of the first computer network, the method comprising:
creating on the first computer network, for a first end-user of the plurality of end-users, a first social shopping cart for storing product information for each of a plurality of product items, wherein a second end-user of the plurality of end-users has permission to view the contents of the first social shopping cart;
creating on the first computer network, for the second end-user of the plurality of end-users, a second social shopping cart for storing product information for each of a plurality of product items, wherein a third end-user of the plurality of end-users has permission to view the contents of the second social shopping cart, and the second social shopping cart automatically includes the contents of the first social shopping cart;
in response to a request from the first end-user, performing a particular action upon the first social shopping cart; and
in response to performance of the particular action by the first computer network upon the first social shopping cart, automatically:
sending a notification of the particular action performed upon the first social shopping cart to a communication device of the second end-user;
performing the particular action upon the second social shopping cart;
sending a notification of the particular action performed upon the second social shopping cart to a communication device of the third end-user.

16. The non-transitory computer-readable medium according to claim 15, wherein the particular action performed upon the first social shopping cart comprises one of adding to or removing from the first social shopping cart, information for a particular product.

17. The non-transitory computer-readable medium according to claim 15, wherein the first computer network manages access by the second end-user to the first social shopping cart according to permissions provided by the first end-user.

18. The non-transitory computer-readable medium according to claim 15, wherein the first computer network functions, at least in part, as an Internet web site of a merchant that supports online shopping by the plurality of end-users.

19. The non-transitory computer-readable medium according to claim 15, wherein the notification of the particular action performed upon the first social shopping cart is transmitted from the first computer network to a user account of the second end-user via a second computer network separate from the first computer network.

20. The non-transitory computer-readable medium according to claim 19, wherein the second computer network comprises a social networking web site that enables communication between members of an online community of family, friends, colleagues, and other personal contacts.

21. The non-transitory computer-readable medium according to claim 15, wherein the first computer network maintains one or more personal reviews of product items and information identifying a corresponding end-user of the plurality of end-users that submitted each of the one or more personal reviews of product items, and wherein the method further comprises:

in response to a request from the first end-user, providing to the first end-user by selecting from the one or more personal reviews of product items, a set of personal reviews of product items submitted by particular end-users of the plurality of end-users, wherein the particular end-users are members of a social networking group to which the first end-user belongs.

\* \* \* \* \*